June 19, 1951 H. W. MOORE 2,557,677
MULTIPLE CHUCK COIL WINDING MACHINE
Filed Aug. 20, 1945 3 Sheets-Sheet 1

Inventor
Harry W. Moore
By Henry G. Dybvig
His Attorney

June 19, 1951 H. W. MOORE 2,557,677
MULTIPLE CHUCK COIL WINDING MACHINE
Filed Aug. 20, 1945 3 Sheets-Sheet 2
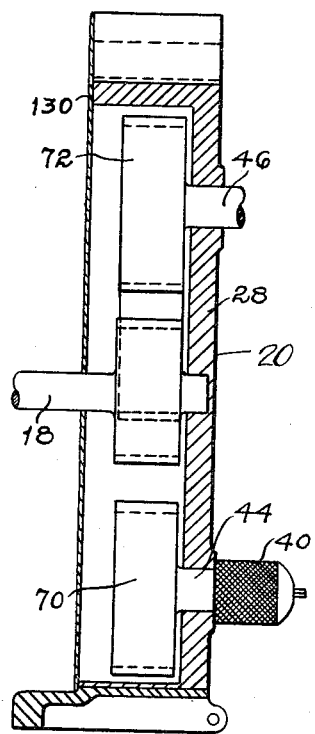
FIG.2
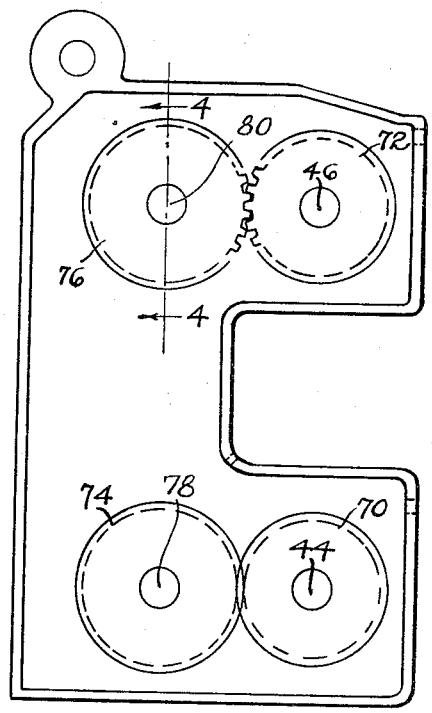
FIG.3
FIG.4
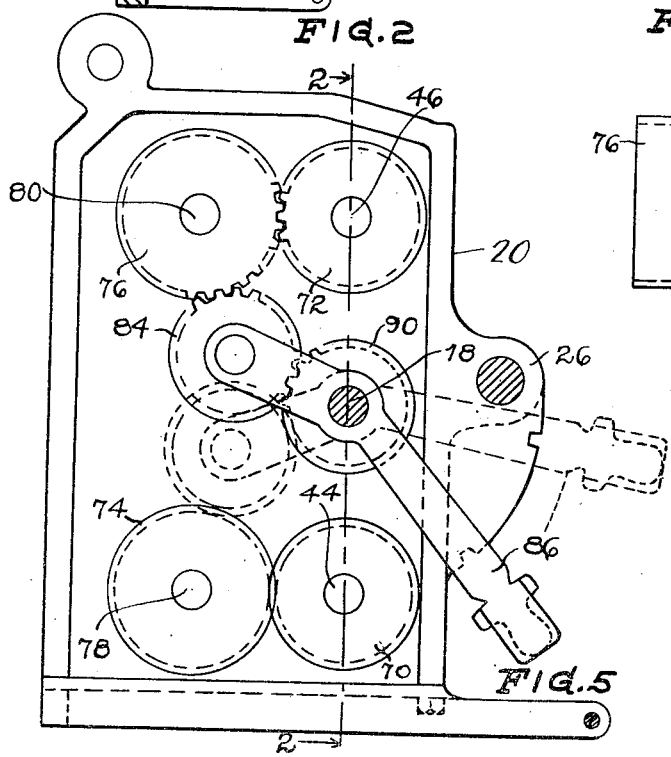
FIG.5
Inventor
Harry W. Moore
By [signature]
His Attorney June 19, 1951  H. W. MOORE  2,557,677
MULTIPLE CHUCK COIL WINDING MACHINE
Filed Aug. 20, 1945  3 Sheets-Sheet 3

Inventor
Harry W. Moore
By Henry G. Dybvig
His Attorney

Patented June 19, 1951

2,557,677

UNITED STATES PATENT OFFICE 2,557,677

MULTIPLE CHUCK COIL WINDING MACHINE

Harry W. Moore, Dayton, Ohio

Application August 20, 1945, Serial No. 611,478

5 Claims. (Cl. 242—9)

1

This invention relates to winding machines and more particularly to winding machines adapted to wind a plurality of coils simultaneously.

In the past, coil winding machines have been extensively used that wind a plurality of coils mounted upon a common spindle. When it comes to coils that cannot be mounted upon a spindle, the coil is mounted in a chuck, so as to be wound individually.

Coil, as used herein, includes various types of wire coils or other wound coils, spools or bobbins. Furthermore, coil is used to designate various types of windings, as for example, random winding, layer winding, honeycomb winding and any other type of winding that may be used in a coil.

An object of this invention is to provide a multiple chuck winding machine for winding a plurality of coils simultaneously, which coils are supported in separate chucks.

Another object of this invention is to provide a multiple chuck winding machine wherein some of the chucks support coils that are being wound while other chucks are being unloaded and prepared for the winding of other coils, so that the operator may be unloading and loading chucks while other chucks are supporting coils that are in the process of being wound.

Another object of this invention is to provide a multiple chuck winding machine that is provided with a plurality of extension units interconnected to each other, so that the number of chucks may be selected to suit the particular job by adding or subtracting extension units.

Another object of this invention is to provide a coil winding machine having a master unit adapted to have attached thereto one or more auxiliary units, each of the auxiliary units being provided with chucks, the chucks being driven through the driving mechanism in the master unit.

Another object of this invention is to provide a coil winding machine wherein some of the coils are being wound while other coils are being removed and suitable cores, forms or supports are mounted in position for rewinding, so that when one set of coils is completely wound, these coils may be removed from the machine while another set of coils is being wound.

Other objects and advantages reside in the construction of parts, the combination thereof and the mode of operation, as will become more apparent from the following description.

In the drawings,

Figure 1 is a perspective view of a multiple chuck coil winding machine.

2

Figure 2 is a cross sectional view taken substantially on the line 2—2 of Figure 5.

Figure 3 is a side elevational view of one of the auxiliary station units, with the end plate or cover removed.

Figure 4 is a fragmentary cross sectional view taken substantially on the line 4—4 of Figure 3.

Figure 5 is a side elevational view of the master unit with the face plate or cover removed.

Figure 6:
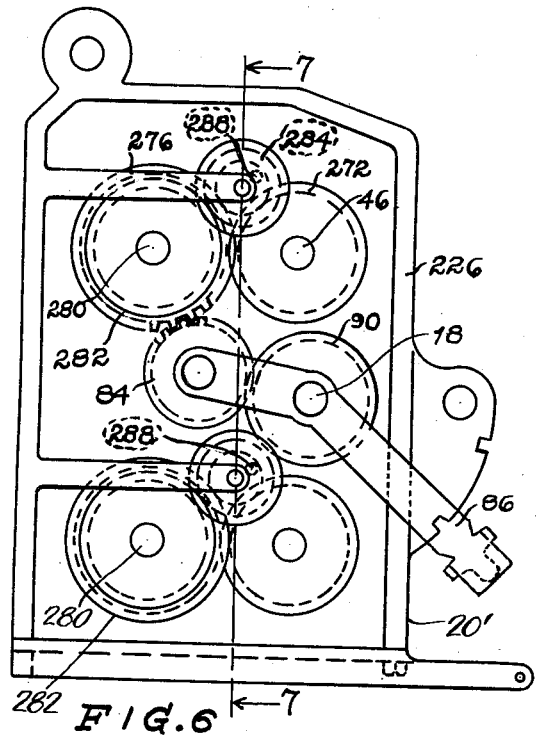

Figure 6 discloses a modified master unit with the face plate removed.

Figure 7:
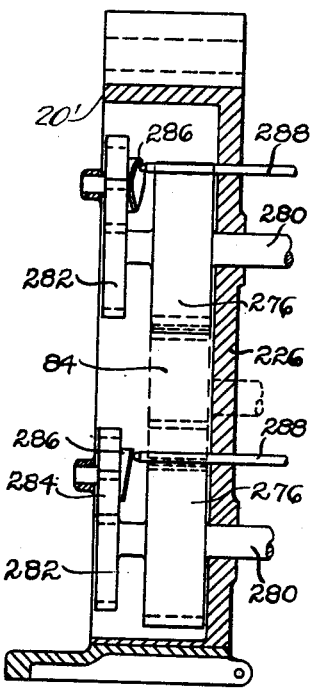

Figure 7 is taken substantially on the line 7—7 of Figure 6.

Referring to the drawings, the reference character 10 indicates the power unit having mounted therein a suitable motor, gear mechanism, control mechanism for laying the winding, a counter mechanism 12, automatic brake mechanism, automatic position stopping mechanism, switches 14 and 16 and the necessary parts associated therewith. A drive shaft 18, shown in Figure 5, projects from the unit 10 and transmits power to the coil winding unit which will now be described.

Figure 1:
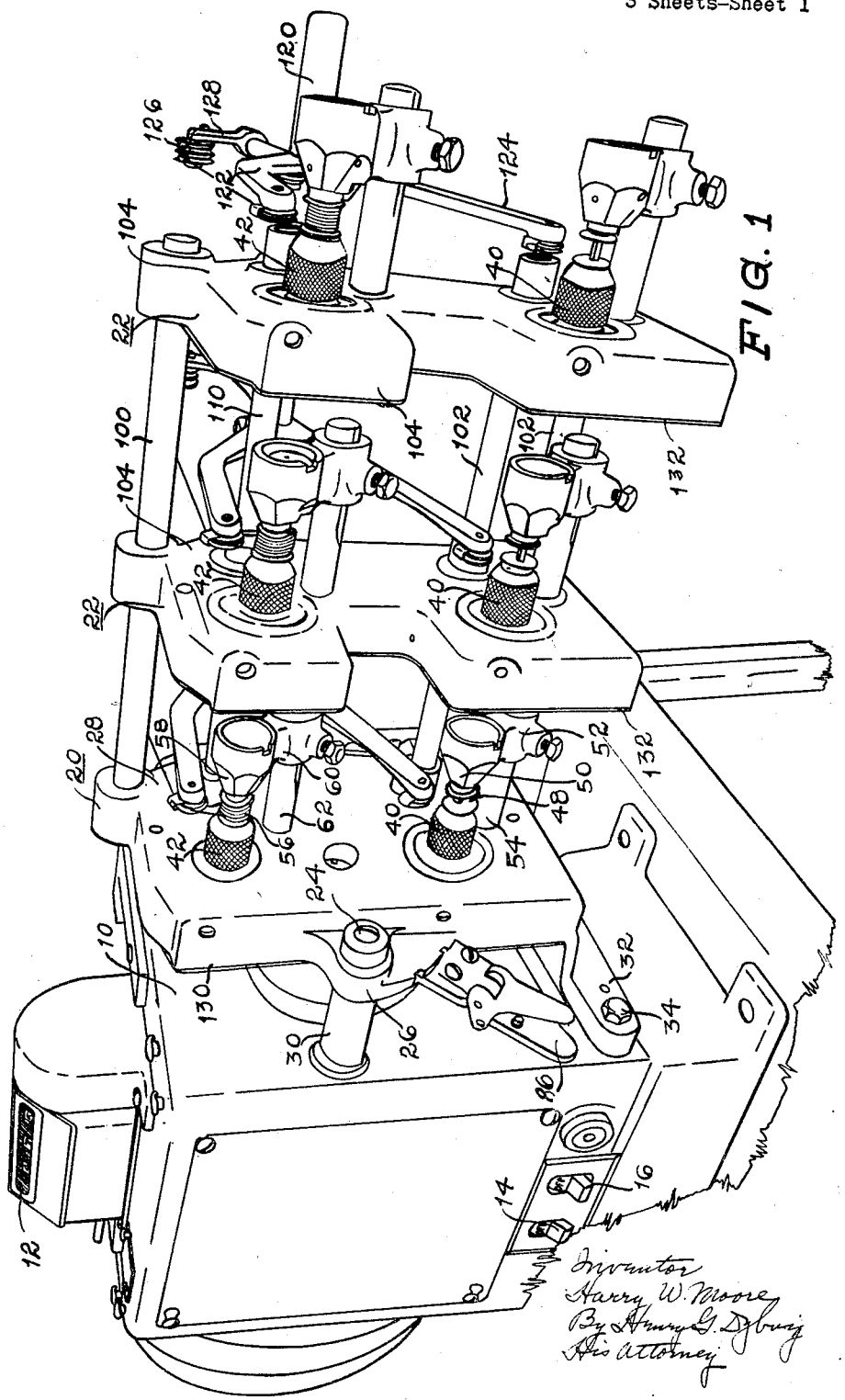

The coil winding unit includes a master station unit 20 and a plurality of extension or auxiliary station units 22, two of which have been shown in Figure 1. The master unit 20 is attached to the power unit 10 by a bolt 24, passing through an ear 26 in the housing or casing 28 of the master unit. A suitable spacing member 30 is mounted between the power unit 10 and the ear 26 to hold the master unit in proper aligned relation. An ear 32, offset from the casing 28, abuts the side of the power unit 10 and is held in position by a suitable screw 34.

A pair of chuck members 40 and 42, fixedly attached to stubshafts 44 and 46 respectively, are located on one side of the casing 28 of the master unit 20. The exterior of the chuck members 40 and 42 has been knurled, so as to facilitate the removal of the chuck members from the spindles or stubshafts 44 or 46, as the case may be, to permit substitution of other types of chucks. The type of chuck used depends entirely upon the nature or construction of the spool or reel to be wound.

In Figure 1, the chuck 40 supports a spool 48 engaged by a suitable tailstock member 50 carried upon a bracket 52 mounted upon a stubshaft 54, fixedly attached to the casing or housing 28. The chuck 42 supports a partially wound spool 56 held in position by a tailstock member 58 mounted upon a bracket 60 adjustably supported upon a stubshaft 62. The type of tailstock used depends entirely upon the type of spool or reel upon which the coil is wound. As may be clearly seen in Figure 1, a coil 56 is partially wound while the spool, bobbin or form 48 is unwound. A suitable driving mechanism for rotating the chucks 40 and 42 permits the rotation of one of these chucks, while the other one stands still, as will appear more fully from the description of the driving mechanism that follows.

As may best be seen by referring to Figures 2 and 5, the spindle 44 supports a gear or pinion 70 that may be keyed or otherwise secured to the spindle 44. The spindle 46 has fixedly attached thereto a gear or pinion 72. The pinion 70 meshes with a gear 74 and the pinion 72 meshes with a gear 76.

The gear 74 or the gear 76 is optionally driven through a gear 84 pivotally mounted on the end of a gear shift lever 86 pivoted on the shaft 18. The gear 84 meshes with a gear 90 fixedly attached to the shaft 18, so as to be driven thereby. When the lever is in the full line position shown in Figure 5, power is transmitted from the shaft 18 through the gear 90 meshing with the gear 84, meshing with the gear 76, driving the gear 72 fixedly attached to the spindle 46, rotating the chuck member 42 and thereby rotating the support for the spool 56, shown in Figure 1. By adjusting the lever 86 from the full line position to the dot-dash position shown in Figure 5, the movement of the chuck 42 is arrested and the chuck 40 is then driven through the gear 84, meshing with the gear 74. This permits the unloading of the spool 56 and the mounting of a new form or coil support in this chuck, while the coil is being wound upon the form 48 mounted between the chuck 40 and the tailstock 50.

In addition to the chucks and the coils associated with the master unit 20, coils are also wound by each of the auxiliary or extension units 22 in a manner which will now be described. Only one of the auxiliary units will be described in detail, for the reason that the two auxiliary units shown are identical. Instead of two auxiliary units, any number of auxiliary units may be used, as will appear more fully from the description that follows.

The gears 74 and 76, as shown in Figure 3, are attached to the shafts or spindles 110, the shafts or spindles 110 terminating in tongues seated in the kerf or exposed socket 82 in the shaft or spindle 80. The opposite end of the shaft or spindle 110 is formed with a kerf or exposed socket identical to the kerf 82. By this arrangement, the shafts or spindles 110 are driven by the shafts or spindles 78 and 80 respectively, so that when the auxiliary station unit is attached to the master unit, the chucks in the auxiliary station unit will move in unison in the corresponding chucks in the master unit. In view of the fact that only one of the chucks in the master unit is rotated at a time, only one chuck in each auxiliary station unit will be rotated at a time. In the preferred embodiment shown in Figure 1, one master unit and two auxiliary station units have been shown. Instead of two auxiliary station units, any number of auxiliary station units may be used. However, in using more than two auxiliary units, longer shafts 100 and 102 are used to support the units.

The housing of the master station unit is provided with a cover member 130. Each of the auxiliary station units are provided with a cover member 132.

A wire-laying mechanism, which includes a rod or shaft 120, driven from a suitable cam in the power unit, has mounted thereon wire-laying brackets including the arms 122 and 124 and a guide pulley 126 mounted upon a suitable bracket 128. This mechanism swings in unison in response to a cam and operates like any other wire-laying mechanism. There are as many arms as chucks.

A pair of supporting rods 100 and 102 have their ends fixedly attached to the master station unit and passing through suitable apertures in the casing 104 of auxiliary station units. The two rods 100 and 102 hold the auxiliary station units in fixed spaced relation with respect to the master station unit. Each auxiliary station unit is provided with a chuck 40 and a second chuck 42, identical to the chucks described in connection with the master station unit. The chucks 40 and 42 are mounted upon spindles 44 and 46 respectively, journalled in the casing 104. The spindles are fixedly attached to the pinions or gears 70 and 72, shown in Figure 3. The gear 70 meshes with a gear 74 and the gear 72 meshes with a gear 76 mounted upon the spindles 78 and 80 respectively. These gears and spindles are identical to those described in connection with the master station unit.

In Figure 6 a modified master unit 20' has been shown. It includes a casing 226. On the end of the shaft 18 within the casing is mounted a gear 90 engaging a gear 84 supported upon the lever 86, identical to the device disclosed in the preferred embodiment. The gear 84, as shown in Figure 6, meshes with a gear 276 driving a gear 272 mounted upon a shaft 46 driving a chuck not shown. The gear 276 is keyed to a shaft 280 supporting a gear 282 driving a gear 284 fixedly attached to a cam sector 286 reciprocating a shaft 288 that supports a wire guide for laying the wire on the spool, which guide has not been shown in the drawing, for the reason that the guide may be substantially identical to the guide shown in Figure 1.

An identical set of gears are located in the lower portion of the casing and are driven through the gear 84 whenever the lever 86 is adjusted to cause the gear 84 to mesh with the lower gear 276.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A multiple chuck coil winding machine including power means; a master station unit including two sets of gears, a pair of chucks, one interconnected to one set of gears and the other connected to the other set of gears, a pair of spindles offset from the chucks, one spindle being driven by one set of gears and the other spindle being driven by the other set of gears, said spindles terminating in exposed sockets, and gear shift means including a gear shift lever having two positions, said gear shift lever when in one position connecting the power means to one set of gears and when in the other position connecting the power means to the other set of gears; and a plurality of auxiliary stations, each of the auxiliary stations including two sets of gears corresponding to the two sets of gears in the master station unit, a pair of chucks, one driven by one set of gears and the other driven by the other set of gears, and a pair of spindles, said spindles being offset from the chucks, there being one spindle for each set of gears for driving the same, each of said spindles being provided with an exposed socket and with means for engaging a socket of another station, so that when the gear shift lever is in one position one set of gears in all of the station units are driven together with the chucks interconnected thereto and when the gear shift lever is shifted to the other position the other set of gears and chucks are driven.

2. A multiple chuck coil winding machine including a power unit; a housing arranged in spaced relation from the power unit; a master station unit mounted in the housing, said master station unit including two sets of gears, a pair of chucks one for each set of gears, said chucks being mounted on the outside of the housing, a pair of spindles offset from the chucks, one spindle being driven by one set of gears and the other spindle being driven by the other set of gears, said spindles terminating in exposed sockets; a plurality of aligned housings; auxiliary station units, there being one station unit mounted within each of said aligned housings, each auxiliary station unit including two sets of gears corresponding to the two sets of gears in the master unit, a pair of chucks mounted on the outside of the housings, one chuck being connected to one set of gears and the other to the other set of gears, and a pair of spindles, said spindles being offset from the chucks, there being one spindle for each set of gears for driving the same, each of said spindles being provided with an exposed socket and with means for engaging an exposed socket of another station unit, one pair of said sockets being located in the master unit; and means for selectively interconnecting the power unit to either set of gears of the master unit so that when one set of gears in the master unit is driven the corresponding set of gears in the auxiliary units is driven.

3. A multiple chuck coil winding machine including a power unit; a housing arranged in spaced relation from the power unit; a master station unit mounted in the housing, said master station unit including two sets of gears, a pair of chucks one for each set of gears, said chucks being mounted on the outside of the housing, a pair of spindles offset from the chucks, one spindle being driven by one set of gears and the other spindle being driven by the other set of gears, said spindles terminating in exposed sockets; a gear shift lever having two positions, means controlled by the gear shift lever for interconnecting the power unit to one set of gears when the gear shift lever is in one position and to the other set of gears when the gear shift lever is in the other position; and a plurality of aligned housings; auxiliary station units, there being one station unit mounted within each of said aligned housings, each auxiliary station unit including two sets of gears, a pair of chucks mounted on the outside of the housings, one chuck being connected to one set of gears and the other to the other set of gears, and a pair of spindles, said spindles being offset from the chucks, there being one spindle for each set of gears for driving the same, each of said spindles being provided with an exposed socket and with means for engaging an exposed socket of another station unit, one pair of said sockets being located in the master unit, so that when the gear shift lever is in one position one set of gears are driven and when in the other position the other set of gears are driven.

4. A multiple chuck coil winding machine including a power unit; a plurality of aligned housings; a plurality of coil winding station units there being one coil winding unit in each housing, each of said coil winding units including two sets of gears, a pair of exposed chucks, means for drivingly interconnecting the chucks to the gears, there being one chuck for one set and another chuck for the other set of gears, a pair of spindles, each of said spindles including an exposed socket, there being one spindle connected to one set of gears and another spindle connected to another set of gears; and means for interconnecting the spindles of one unit to the exposed socket of another unit; and means for selectively connecting the power unit to one set of gears for driving one chuck of each station unit, then shifting the power unit to the other set of gears so as to drive the other chuck of each station.

5. A multiple chuck coil winding machine including a power unit; a plurality of aligned housings; means for removably attaching the housings together and in fixed spaced relation from the power unit; a plurality of coil winding units, there being one coil winding unit mounted within each of said housings, each coil winding unit including two sets of gears, a pair of chucks mounted on the outside of the housing, one chuck being connected to one set of gears and the other chuck connected to the other set of gears, a pair of spindles, said spindles being offset from the chucks, there being one spindle for each set of gears for driving the same, each of said spindles being provided with an exposed socket, means for interconnecting the spindles of one unit to the exposed socket of another unit, and gear shift means including a gear shift lever for connecting the power unit first to one set of gears while unloading and loading the chucks connected to the other set of gears, then shifting the gear shift lever so as to connect the power unit to the other set of gears.

HARRY W. MOORE.

REFERENCES CITED

The following references are of record in the file of this patent:

UNITED STATES PATENTS

| Number | Name | Date |
|---|---|---|
| 714,897 | Hanson | Dec. 2, 1902 |
| 966,827 | Gustave | Aug. 9, 1910 |
| 1,449,093 | Finley | Mar. 20, 1923 |
| 1,627,831 | Busey et al. | May 10, 1927 |
| 1,664,155 | Brugger | Mar. 27, 1928 |
| 1,716,089 | Rust | June 4, 1929 |
| 1,944,581 | Snyder | Jan. 23, 1934 |
| 2,131,147 | Siegenthaler | Sept. 27, 1938 |
| 2,246,143 | Patton | June 17, 1941 |
| 2,272,940 | Gerard | Feb. 10, 1942 |